R. S. SHAW.
MOTION PICTURE MACHINE.
APPLICATION FILED FEB. 7, 1917.
1,258,712.
Patented Mar. 12, 1918.
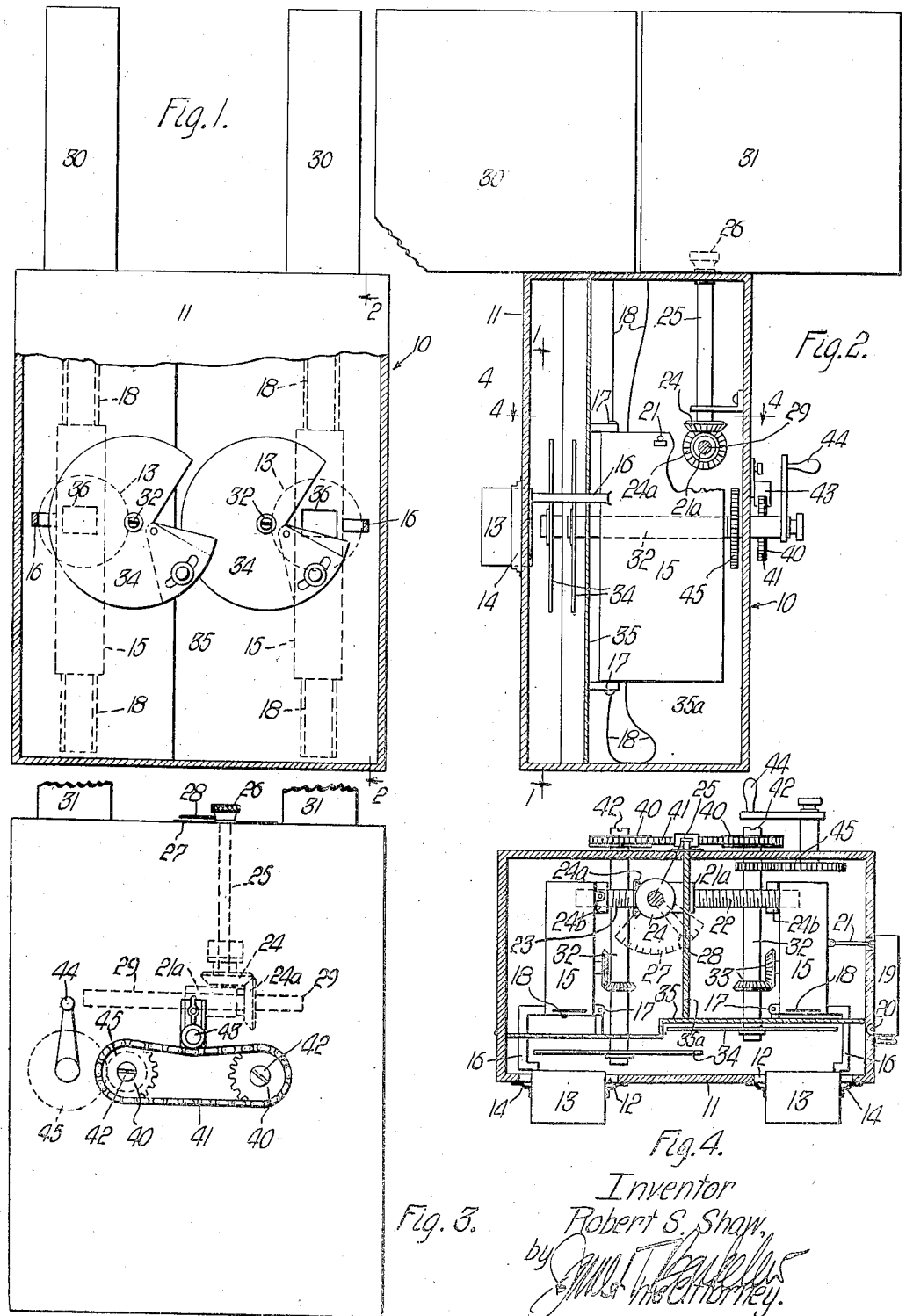

UNITED STATES PATENT OFFICE.

ROBERT S. SHAW, OF LOS ANGELES, CALIFORNIA, ASSIGNOR OF ONE-HALF TO J. F. KAVANAUGH, OF LOS ANGELES, CALIFORNIA.

MOTION-PICTURE MACHINE.

1,258,712.  Specification of Letters Patent.  Patented Mar. 12, 1918.

Application filed February 7, 1917. Serial No. 147,097.

*To all whom it may concern:*

Be it known that I, ROBERT S. SHAW, a citizen of the United States, residing at Los Angeles, in the county of Los Angeles, State of California, have invented new and useful Improvements in Motion-Picture Machines, of which the following is a specification.

This invention relates to motion picture cameras; and a primary object of the invention is the provision of a compound motion picture camera in which a plurality of motion picture films may be simultaneously exposed to the same scene.

It is now the custom in many cases to take more than one exposure of important scenes in motion picture plays and the like. For instance, where there may be some doubt as to the particular speed at which the motion picture film should be exposed, it may be desirable to expose two or more films at slightly different rates; so that the one which afterward proves to have been taken at the best speed can be finally selected for use. And, where important scenes are being taken, especially where the cost of production of the scene is very great, it is desirable to expose more than one film, so that if any one film, or any part thereof, proves to be defective, the scene shall not thereby be lost.

It is a general object of my invention to provide a convenient mechanism to enable a single operator to expose a plurality of films, either at synchronous speed or at different speeds; and it is an object to provide such a device in simple and compact form, easily operated, and not liable to disorder. These, and other objects of my invention, appear in the following specification, wherein I explain a preferred form of my invention, reference being had to the accompanying drawing, in which, for the purpose of this specification, I have illustrated said preferred form of my invention. In said drawings Figure 1 is a front view of my improved camera mechanism, with parts in section taken as indicated by line 1—1 on Fig. 2; Fig. 2 is a section taken as indicated by line 2—2 on Fig. 1; Fig. 3 is a rear elevation of the mechanism; and Fig. 4 is a horizontal section taken as indicated by line 4—4 on Fig. 2.

In the drawings numeral 10 designates a suitable box or case within which a plurality of camera mechanisms may be mounted. In the drawings I illustrate my complete device as including two camera mechanisms; but it will be apparent that my invention may apply to any number of camera mechanisms interconnected and actuated in coöperation as herein described. Where two camera mechanisms are used, I provide the front board 11 with two apertures 12 to accommodate the two lenses 13 and to provide for the slight adjusting movement of these lenses, which is hereinafter explained. A light excluding joint is made between the front board and the lenses by means of some suitable flexible member 14; and each lens 13 is mounted upon and connected with its corresponding film advancing mechanism 15 by some suitable connective supporting means, as for instance, the arm shown at 16. Each film advancing mechanism, as shown at 15, is mounted upon vertical pivots 17, so that the film advancing mechanism, and the lens connected thereto, may be adjusted about the vertical axes of the pivots 17 to point the lenses at the same point ahead of the camera; and, at the same time, to keep the film advancing mechanisms, and the films 18, in proper position behind the respective lenses. Any suitable view finder, as shown at 19, may be pivoted at 20 and may be connected by a suitable connection 21 to one of the mechanisms 15, so that the view finder will show the scene upon which this mechanism and its lens 13 is pointed.

I provide suitable manually operatable means for adjusting the convergence of the lenses 13. This means may comprise a horizontal shaft 29 having right-handed screw-threads 22 upon one end and left-handed screw-threads 23 upon the other end; said screw-threaded ends engaging in nuts 24ᵇ at the rear ends of the film advancing mechanisms 15. The shaft 29 may be carried in a suitable bearing 21ᵃ and may have a bevel gear 24ᵃ meshing with a gear 24 carried on a vertical shaft 25. Shaft 25 has a thumb-nut or wheel 26 upon its upper end; and a dial 27 may be provided on top of the camera box, the thumb-nut 26 carrying an indicator finger 28. The dial 27 may be graduated to suitable distances, so that, when the scene is at a certain distance, say 30 feet, the indicator is then turned to a corresponding position on the dial; when the lenses 13 will converge sufficiently to be each pointed at a single point thirty feet from the camera. And the view finder 19 will then show the field of view of both lenses.

I do not herein enter into the details of construction of the film advancing mechanisms 15; because these mechanisms may be of any suitable character for advancing the film step by step across the spaces behind the lenses. The film 18 is drawn in the usual manner from film-box 30, and passed back into film-box 31. Each film advancing mechanism may be actuated from a shaft 32, through the connective medium of gears 33. The two shafts 32 carry on their front ends the shutters 34, of any usual or suitable design; and the construction is made so that one of the shutters is in front of and overlaps the other, so as to make the whole device compact and as small in size as possible. Behind the shutters there is the usual partition board 35, having apertures 36 directly behind the lenses and in front of the films. This partition board has an offset in its center, as illustrated in Figs. 2 and 4, and I also provide a longitudinal partition 35ª which may be of hard rubber to electrically insulate the two mechanisms and the two films and thereby reduce the bad effects of "static" charges on the films.

The rear ends of the shafts 32 project out through the rear walls of the camera box 10, and they carry removable sprocket wheels 40. A sprocket chain 41 passes over the two sprocket wheels, serving thus to interconnect the two shafts 32. One or both of the sprocket wheels 40 is made removable, by the removal of the screw 42; so that larger or smaller sprockets may be substituted; and an adjustable idler wheel 43 is used to keep the sprocket chain tight. A crank 44 is provided and connected by gearing 45 with one of the shafts 32.

From the foregoing description the advantages and novel features of my device will be readily understood. The operation of the device is simple. If the scene is at a certain distance, then the pointer 28 is set on the dial 27 to indicate that distance, and the camera is then pointed at the scene, with the aid of view finder 19. The films are then exposed in the usual manner by the rotation of the crank 44; the final result being that, instead of having exposed a single film, the operator has exposed a plurality of films. As hereinbefore stated, my invention is not limited to only two mechanisms, but may be applied to any number of mechanisms by extending the principles of construction and operation herein explained. If it is desired to run one film slightly slower or faster than the other, corresponding substitutions of sprockets are made at 40; and then the best film may be finally selected.

Although I have proceeded with some particularity and detail to set forth a preferred form of my invention, I have done so for the purpose of rendering my invention clearly intelligible to those skilled in the art; and I do not thereby limit myself to the specific details herein described. On the other hand, various detailed changes may be made in my invention, without departing from the scope thereof as set forth in the following claims.

Having described a preferred form of my invention, I claim:

1. In combination, a plurality of motion picture camera mechanisms arranged side by side, and connective means whereby said mechanisms may be coöperatively actuated, said means embodying means capable of change to make one of said motion picture mechanisms operate at a different speed from that of another.

2. In combination, a plurality of motion picture camera mechanisms each with a film advancing mechanism and a lens, each film advancing mechanism with its lens being pivoted on a vertical pivot; means to coöperatively actuate the film advancing mechanisms, said means embodying means capable of change to make one of said film advancing mechanisms operate at a higher speed than another, and means to coöperatively move the said mechanisms and lenses about their pivots to focus them upon a single point.

3. In combination, a plurality of motion picture camera mechanisms each with a film advancing mechanism and a lens, each film advancing mechanism with its lens being pivoted on a vertical pivot; means to coöperatively actuate the film advancing mechanisms, said means embodying means capable of change to make one of said film advancing mechanisms operate at a different speed from that of another, means to coöperatively move the said mechanisms and lenses about their pivots to focus them upon a single point, said means including manually operatable means to move the said mechanisms and lenses equally and oppositely about their respective pivots, and a view finder connected to one of said pivoted mechanisms and lenses.

4. In combination, a plurality of motion picture camera mechanisms each with a film advancing mechanism and a lens, each film advancing mechanism with its lens being pivoted on a vertical pivot; means to coöperatively actuate the film advancing mechanisms, said means embodying means capable of change to make one of said film advancing mechanisms operate at a different speed from that of another, means to coöperatively move the said mechanisms and lenses about their pivots to focus them upon a single point, said means including manually operatable means provided with a graduated scale to move the said mechanisms, and lenses equally and oppositely about their respective pivots, and a view finder connected to one of said pivoted mechanisms and lenses.

5. In combination, a plurality of motion picture camera mechanisms, and connective means whereby said mechanisms may be coöperatively actuated at different speeds.

6. In combination, a plurality of motion picture camera mechanisms, means to coöperatively move the said mechanisms to focus them on a common point, and connective means whereby said mechanisms may be coöperatively actuated at different speeds.

In witness that I claim the foregoing I have hereunto subscribed my name this 29th day of January 1917.

ROBT. S. SHAW.

Witnesses:
J. F. KAVANAUGH,
ELWOOD H. BARKELEW.